Aug. 18, 1959    P. L. SCHNEIDER ET AL    2,900,057
CLUTCH FOR ENGINE STARTING DEVICE
Filed Feb. 3, 1954
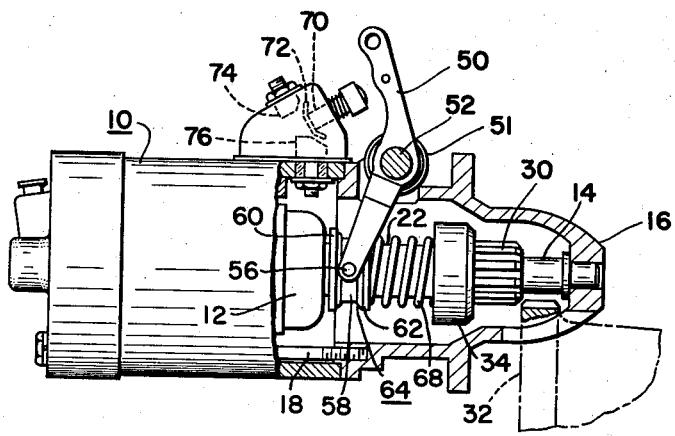
Fig. 1
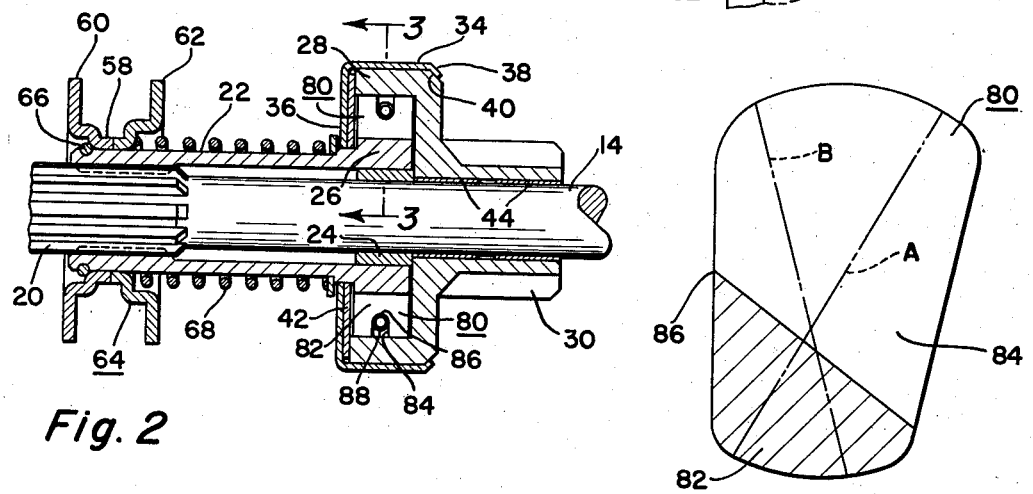
Fig. 2
Fig. 5
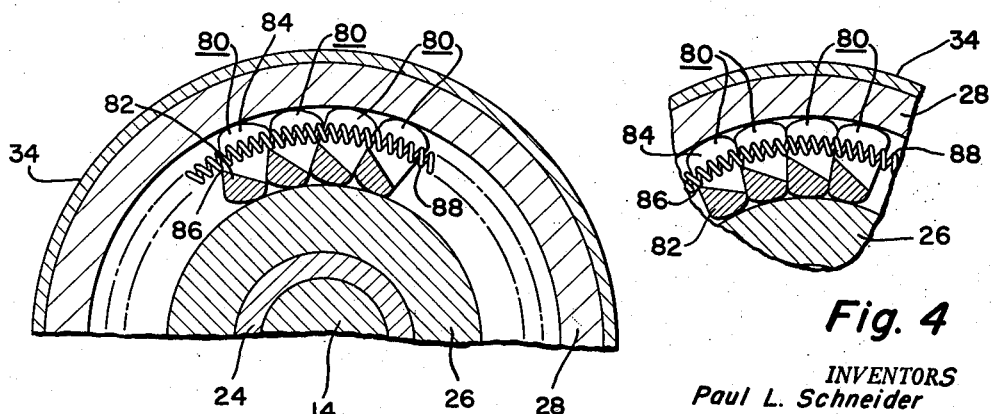
Fig. 3
Fig. 4
INVENTORS
Paul L. Schneider
BY Harold J. Cromwell
William H. Taylor
Their Attorney United States Patent Office 2,900,057
Patented Aug. 18, 1959

2,900,057

CLUTCH FOR ENGINE STARTING DEVICE

Paul L. Schneider, Harold J. Cromwell, and William H. Taylor, Anderson, Ind., assignors to General Motors Corporation, Detroit, Mich., a corporation of Delaware Application February 3, 1954, Serial No. 407,998

3 Claims. (Cl. 192—45.1)

This invention relates to engine starting devices and one-way overrunning clutches designed particularly for use with starting motors for starting internal combustion engines and operative to establish a driving connection between the starting motor and engine by means of which the starting motor effects rotation of the engine crankshaft for starting purposes, but which is rendered inoperative as soon as the engine starts to run under its own power. While designed primarly for this particular use, a clutch constructed in accordance with the present invention is operative to establish driving connection between any driving and driven shaft for effecting movement of the driven shaft in one direction only.

Engine starting apparatus in common use particularly for automotive vehicles includes an electric motor, a pinion shiftable into engagement with the fly wheel gear of the engine to be started and an overrunning clutch for connecting the motor with the pinion to crank the engine and for permitting the pinion to overrun the motor when the engine becomes self-operative. The overrunning clutch normally employed comprises two concentric shells one of which is connected to the motor and the other to the driving pinion and between which rollers are positioned. One or the other of these shells has camming surfaces formed thereon which cooperate with the rollers upon operation of the motor in one direction to wedge the rollers between the shells, thus establishing a driving connection between the shells so that the driven shell which is connected to the pinion is rotated by the driving shell which is connected to the motor. When the engine becomes self-operative, the driven shell rotates faster than the driving shell and this is effective to move the rollers out of wedging position and release the clutch.

According to the present invention, instead of providing camming surfaces on one of the shells which comprise the clutch and rollers cooperating therewith, the clutch is of the sprag type in which the surface of both the driving and driven shells is smooth and cylindrical throughout and positioned between the shells are a plurality of tiltable gripping elements of irregular form which establish a driving connection between the shells when tilted in one direction but permit free rotation of the shells relative to each other when tilted in the opposite direction, and also permit free rotation of the shells relative to each other when the driven shell is rotated faster than the driving shell.

An object of the present invention is to provide a clutch of the character referred to which is simple in construction with a minimum of parts, positive in action and inexpensive to manufacture.

A further object of the invention is to provide a clutch of the character described in which the gripper elements are urged toward gripping position by a single spring which is also effective to offset the effect of centrifugal force, so as to minimize the effect of friction between the gripper parts and associated clutch members when the clutch is released.

It has been found that in large installations, such as heavy trucks or busses, for example, where the load on the starting motor is a heavy one, that certain difficulties are encountered if the starting motor drives the engine through the medium of the conventional overrunning roller clutch. Due to the heavy load and the torque limitations of such a clutch, there is a tendency for the clutch to slip to some extent. This produces wear and wear increases the tendency to slip, all of which is, of course, objectionable. It is, therefore, a further object of the present invention to provide a starting motor having a driving clutch of the one-way overrunning type with maximum driving torque so that it will operate with heavy loads without slippage and with minimum wear, but which will release easily and immediately when the associated engine starts to run under its power.

Further objects and advantages of the present invention will be apparent from the following description, reference being had to the accompanying drawings wherein a preferred embodiment of the present invention is clearly shown.

In the drawings:

Figure 1 is a longitudinal view, partly in section, of an engine starting motor and associated clutch in which the present invention is embodied;

Figure 2 is a longitudinal view, partly in section, of the clutch and associated parts comprising the starter drive;

Figure 3 is a section on the line 3—3 of Figure 2;

Figure 4 is a detail section similar to Figure 3 but showing the gripping elements of the clutch in different position; and Figure 5 is an enlarged detail view of one of said gripping elements.

A clutch constructed according to the present invention is shown in the drawings associated with an engine starting motor of conventional construction having a field frame 10, a rotating armature 12 and a rotating shaft 14 on which the armature is supported and which rotates therewith. The motor is of entirely conventional construction and need not be further described.

The left end of the motor shaft 14, as seen in Fig. 1, is suitably journalled in an end plate (not shown) secured to the field frame 10 and the right end of such shaft is journalled in the wall of a housing 16 which houses the clutch and driving pinion and is suitably secured to the field frame by bolts 18.

The shaft 14 has external splines 20 formed thereon which cooperate with internal splines on a sleeve 22 which is slidable on the shaft 14. This sleeve has a bearing 24 journalled on a smooth portion of the shaft 14. The right end of the sleeve 22 is of enlarged outside diameter adjacent the bearing 24 as indicated at 26 to form what may be termed an inner clutch ring, and this ring is of the same outside diameter throughout, forming a cylindrical surface. Spaced from the inner clutch ring 26 is an outer clutch ring 28, the inner diameter of which is the same throughout, forming a cylindrical surface which is concentric with the surface of the inner ring 26. The outer clutch ring 28 is integral with the pinion 30, which is movable into engagement with the fly wheel gear 32, shown in Fig. 1, by means later described and is operative to rotate said gear to start the engine when the outer ring 28 is rotatably connected to the inner ring 26, if the pinion is in engagement with said gear and the starting motor is energized.

The inner and outer clutch rings are maintained in assembled relation by a metal shell having a part 34 surrounding and engaging the outer surface of the outer clutch ring 28 and a part 36 normal thereto which is provided with a central opening through which the sleeve 22 extends. The retaining shell has an inwardly bent part 38 which engages a bevelled surface 40 formed on the outer clutch ring 28 and a washer 42 having a central opening that surrounds the sleeve 22 is positioned between the part 36 and the left end of the outer clutch ring 28, and also between the part 36 and a shoulder formed by the enlarged part of sleeve 22 which constitutes the inner clutch ring. Obviously, this retaining shell will prevent any axial movement of the outer clutch ring and pinion relative to the inner clutch ring and driving sleeve.

Pinion bearings 44 are journalled on the shaft 14 between the pinion and said shaft.

The whole clutch assembly is moved to the right, as seen in Fig. 1, by a lever 50 held in the normal position shown in the drawings by a torsion spring 51 and pivoted on a shaft 52 secured in any suitable way in the housing 16. The sleeve 22 is slidable on shaft 14 for this purpose, but is rotatable by the shaft in any position it may occupy through the medium of splines 20. The lower end of lever 50 is bifurcated so as to provide two arms each of which has a pin 56. These pins engage a groove 58 on opposite sides of the motor shaft, said groove being formed between two flanges 60 and 62 of a collar 64 slidable on the sleeve 22 and normally held in the position shown in the drawings by a split ring 66 which engages a suitable groove in the outer surface of sleeve 22.

Movement of the collar 64 to the right in Fig. 1 exerts pressure on a spring 68 positioned between the collar 64 and shell 36, which effects movement of the clutch assembly and pinion to the right. If the teeth of the pinion 30 do not abut the teeth of the fly wheel gear 32 as the pinion is moved to the right, such pinion moves freely into engagement with the fly wheel gear without opposition and when fully engaged the starting motor switch is closed and rotation of the motor effects rotation of the fly wheel gear until the engine is started. When this takes place, the engine moves the outer clutch member faster than the inner clutch member is rotated by the motor, the clutch is released, as previously indicated, the lever 50 is returned to its original position by spring 51 effecting disengagement of the pinion and stopping of the motor.

If, upon movement of the clutch assembly and pinion to the right, the teeth of the pinion abut those of the fly wheel gear, continued movement of the lever 50 will compress the spring 68 until the lever effects closing of the starting motor switch. This will cause rotation of the motor and pinion. Just as soon as the latter starts to rotate, it moves out of position where its teeth abut those of the fly wheel gear into proper meshing position. The spring 68 will immediately expand, forcing the pinion into proper engagement with the fly wheel gear, after which the action will be as previously described.

As shown in the drawings, the lever 50 is adapted to be manually operated by any suitable form of operating connection which may be pivotally connected to the upper end of said lever. As the lever is moved to effect engagement of the pinion with the fly wheel gear, the upper part of the lever, after a predetermined movement thereof, engages a spring-held plunger 70 which carries a movable contact 72. Further movement of lever 50 after engagement thereof with the plunger 70 moves the contact 72 into engagement with two fixed contacts 74 and 76 to close the starting motor circuit and cause the motor to rotate and crank the engine. When the lever is released, the spring 51 returns it to normal position, opening the motor circuit and disengaging the pinion 30 from the fly wheel gear 32.

At the present time closing of the motor circuit and movement of the clutch and pinion assembly is generally effected by the electromagnet which is rendered operative upon closing of the ignition switch, or a special manually operable push-button or other instrumentality. Such an operating mechanism is not shown herein, but the lever 50 may be operated by such a magnet instead of manually. A mechanism of this character is shown in the patent to Dyer, 2,105,643, January 18, 1938, in which Fig. 2 shows such a magnet energized upon closing of the ignition switch, and Fig. 3 shows a magnet which is not energized until a special manually operable switch is closed. Either of these arrangements could be substituted for the manual control shown and the function of lever 50 would be the same.

As previously indicated, whenever the starting motor is energized and the pinion 30 engaged with the engine gear 32, the engine will be rotated by the starting motor, if the sleeve 22 is rotatably connected to the pinion 30. To effect this connection, the inner clutch ring 26, which is the driving member of the clutch and is integral with the driving sleeve 22, is connected in driving relation with the outer clutch ring 28, which is the driven member of the clutch, through the medium of a series of tiltable, irregularly shaped elements 80, generally known as sprags. These elements are sufficient in number to substantially fill the annular space between the inner and outer clutch rings, are in substantial contact with each other and are not positioned exactly radially, but each is inclined at a slight angle with respect to a radius. For reasons more fully pointed out later, if the inner clutch member 26 is rotated clockwise, as seen in Fig. 3, the sprags will be tilted to effect driving engagement between the inner and outer clutch rings and consequent rotation of the pinion 32. If the inner clutch ring is rotated in a counterclockwise direction, the sprags will not grip and there will be no driving connection between the inner and outer rings 26 and 28. Likewise, if the outer ring is rotated clockwise by the engine at a speed greater than the speed of rotation of the inner ring, the sprags will be tilted by the outer ring in a direction to prevent them from gripping, so that the driving relation between inner and outer clutch rings will be interrupted as soon as the engine starts to operate under its own power, and the clutch is released so that the engine does not rotate the motor between the time it becomes self-operative and the time the pinion is disengaged from the fly wheel gear.

The elements 80 are of a length substantially equal to the width of the inner ring and that part of each element 80 adjacent the inner clutch ring 26 is a solid piece of metal as indicated at 82, but the outer edges of the elements 80 adjacent the outer clutch ring 28 have slots 84. These slots extend about halfway through the elements 80 at the left side of such elements, as seen in Fig. 3, but at the right side of each element 80 the slot is considerably deeper. Thus, the bottom of each slot forms with the left side of the element 80 an acute angle and the surface of the sprag where the slot 84 joins the right side thereof is a relatively sharp point 86. A helical tension spring 88 engages in the slots 84 and extends entirely around the clutch. This spring normally exerts a force tending to hold the sprags 80 in engagement with the surfaces of outer clutch ring 28 and inner clutch ring 26. When torque load is applied by the starting motor, friction between the surfaces of sprag 80 and the surfaces of outer clutch ring 28 and inner clutch ring 26 tends to rotate the sprags 80 and thereby increase the pressure exerted on the collars 26 and 28 by the sprags 80, so as to cause the motor shaft 14 to drive pinion 30. When the engine begins to operate under its own power, the outer ring 28 will rotate faster than inner ring 26 and thereby rotate the sprags 80 in a direction so as to cause the pressure between the sprags 80 and rings 26 and 28 to be reduced to that exerted by spring 88. A further increase in rotational speed of the pinion 30 by the engine will cause the effect of spring tension of spring 88 to decrease due to centrifugal force and thus reduce the pressure between the sprags 80 and the inner ring 26. This centrifugal force as caused by the rotation of the pinion tends to increase the pressure between sprag 80 and the outer ring 28 without any appreciable effect produced by the spring.

It is manifest that the above parts can be reversed, as for example, the inner ring 26 can be fastened to the pinion 30 and the outer ring 28 can be fastened to the sleeve 22 and be driven by the starting motor 10 through shaft 14. In this embodiment the action of centrifugal force will be similar to that heretofore described with the exception that the speed of the outer ring is determined on the speed of the motor shaft 14.

As already indicated, although the clutch disclosed is of more or less general application, such clutch is of particular value when used with an engine starting motor to establish driving connection between such motor and the engine fly wheel gear and, as a matter of fact, the clutch was primarily designed for this purpose. In heavy-duty installations where large engines, which are hard to crank, are started, the driving torque of the conventional roller clutch is not as great as might be desirable, which is probably due largely to the limited number of rollers which can be employed. This results in some slippage of the clutch where the load is very heavy. Slippage increases the wear and increase in wear, of course, increases the amount of slippage. The driving torque of the clutch such as disclosed herein has been found to be considerably greater than that of a conventional roller clutch of the same size and cost and a starting motor driving the engine through such a clutch can handle heavier loads more satisfactorily than when used with a standard roller clutch, with less slippage and less wear and yet will release easily and quickly, when the engine becomes self-operative and the driven member of the clutch overruns the driving member.

While the embodiment of the present invention as herein disclosed constitutes a preferred form, it is to be understood that other forms might be adopted.

What is claimed is as follows:

1. A one-way overrunning clutch operable to establish driving connection between a prime mover and mechanism operated thereby and having in combination inner and outer clutch rings, one of which is a driving member adapted to be rotatably connected to said prime mover and the other of which is a driven member adapted to be operatively connected to said mechanism, a plurality of tiltable gripping members positioned in the space between said inner and outer clutch rings and so positioned that adjacent elements are substantially in contact with each other throughout said space, said gripping elements causing engagement and disengagement of said clutch by tilting movement only, the outer ends of said elements adjacent the outer clutch ring having open ended slots therein with the open ends of the slots facing said outer clutch ring, a single helical spring positioned in said slots and exerting a pressure on said elements tending to force said elements inwardly toward the inner clutch ring when the engine is inoperative or operating at speeds below a predetermined speed, said spring being responsive to centrifugal force and movable outwardly thereby in said slots when the engine is operating at said predetermined speed or higher speeds, so that said spring is rendered ineffective at said predetermined speeds or higher speeds.

2. A one-way overrunning clutch operable to establish driving connection between a prime mover and mechanism operated thereby and having in combination inner and outer clutch rings, one of which is a driving member adapted to be rotatably connected to said prime mover and the other of which is a driven member adapted to be operatively connected to said mechanism, a plurality of tiltable gripping members positioned in the space between said inner and outer clutch rings for establishing driving connection between the driving and driven members, an open ended slot in each gripping element having its open side facing said outer clutch ring, the adjacent faces of said elements being substantially parallel to and in contact with each other over a majority of their length, a spring in said slots exerting a pressure on all of said elements when the prime mover is inoperative or is operating below a predetermined speed tending to hold said elements in contact with the inner clutch ring and oppose the effect of centrifugal force tending to move said elements outwardly, and means whereby the spring is rendered ineffective to hold the gripping elements and to oppose the effect of centrifugal force when the prime mover is self-operative and is operated at such predetermined speed, said gripping elements causing engagement and disengagement of said clutch by tilting movement only.

3. A one-way overrunning clutch operable to establish driving connection between a prime mover and mechanism operated thereby and having in combination inner and outer clutch rings, one of which is a driving member adapted to be rotatably connected to said prime mover and the other of which is a driven member adapted to be operatively connected to said mechanism, a plurality of tiltable gripping members positioned in the space between said inner and outer clutch rings for establishing driving relation between the driving and driven members, an open ended slot in each gripping element having its open side facing said outer clutch ring, the adjacent faces of said elements being substantially parallel to and in contact with each other over a majority of their length, a single tension spring in said slots engaging all of said elements and exerting a force on each of said elements in a direction such that said force tends to move such elements into gripping position, and means whereby said spring is moved outwardly by centrifugal force when the prime mover becomes self-operative and is operating at a predetermined speed so that said spring is rendered ineffective to exert said force on the gripping elements, said gripping elements causing engagement and disengagement of said clutch by tilting movement only.

References Cited in the file of this patent

UNITED STATES PATENTS

| 1,820,945 | McGrath | Sept. 1, 1931 |
| 2,054,222 | Lapsley | Sept. 15, 1936 |
| 2,245,431 | Critchfield | June 10, 1941 |
| 2,477,176 | Gruenberg | July 26, 1949 |
| 2,520,004 | Gondek | Aug. 22, 1950 |
| 2,546,712 | Avila | Mar. 27, 1951 |
| 2,684,139 | Lewis | July 20, 1954 |
| 2,748,912 | Banker | May 12, 1956 |

FOREIGN PATENTS

| 637,610 | France | May 4, 1928 |